(12) United States Patent
Ogino et al.

(10) Patent No.: US 7,767,605 B2
(45) Date of Patent: Aug. 3, 2010

(54) OPTICAL GLASS

(75) Inventors: Michiko Ogino, Sagamihara (JP); Masahiro Onozawa, Sagamihara (JP)

(73) Assignee: Ohara, Inc., Sagamihara-shi (JP)

( * ) Notice: Subject to any disclaimer, the term of this patent is extended or adjusted under 35 U.S.C. 154(b) by 683 days.

(21) Appl. No.: 11/486,380

(22) Filed: Jul. 14, 2006

(65) Prior Publication Data

US 2007/0027016 A1  Feb. 1, 2007

(30) Foreign Application Priority Data

Jul. 19, 2005  (JP)  ............................. 2005-208043

(51) Int. Cl.
  *C03C 3/16*  (2006.01)
(52) U.S. Cl. ............................. 501/45; 501/46; 501/47; 501/48
(58) Field of Classification Search .................... 501/45, 501/46, 47, 48
  See application file for complete search history.

(56) References Cited

U.S. PATENT DOCUMENTS

| | | | |
|---|---|---|---|
| 4,333,848 A * | 6/1982 | Myers et al. | 252/301.4 P |
| 4,661,284 A * | 4/1987 | Cook et al. | 252/301.4 P |
| 5,526,369 A * | 6/1996 | Hayden et al. | 372/40 |
| 6,333,282 B1 * | 12/2001 | Nakahata et al. | 501/45 |
| 6,875,714 B2 * | 4/2005 | Izuki | 501/45 |
| 2004/0018933 A1 * | 1/2004 | Ogino et al. | 501/45 |
| 2005/0192174 A1 * | 9/2005 | Yamamoto et al. | 501/45 |
| 2005/0253113 A1 * | 11/2005 | Letz et al. | 252/301.4 P |
| 2007/0225146 A1 * | 9/2007 | Wolff et al. | 501/46 |

* cited by examiner

*Primary Examiner*—Karl E Group
*Assistant Examiner*—Elizabeth A Bolden
(74) *Attorney, Agent, or Firm*—Westerman, Hattori, Daniels & Adrian, LLP

(57) ABSTRACT

Provided is an optical glass having high refractivity and high dispersibility, having good moldability in precision pressing, and having high transmittance and good internal quality, of which the transmittance reduction with time is prevented. The optical glass has a Pt content of at most 1.5 ppm, and is characterized in that, when a sample of the glass polished on both surfaces and having a thickness of 10 mm is irradiated with UV and/or visible light at a light-receiving energy of at most $0.4\ \mathrm{mW\cdot cm^{-2}}$ for at least 200 hours, then the difference in the internal transmittance to light having a wavelength of 420 nm, before and after the irradiation (before irradiation—after irradiation) of the sample, as calculated in terms of the sample having a thickness of 10 mm, is at most 0.1.

17 Claims, No Drawings

OPTICAL GLASS

BACKGROUND OF THE INVENTION

Description of the Related Art

The recent tendency toward increased integration and enhanced function for optical instruments is much advanced, for which the demand for high-definition, lightweight and down-sized optical systems is being much increased, and for realizing the demand, optical planning with optical lenses comprising high-refractivity high-dispersion glass is being a mainstream in the art.

As high-refractivity high-dispersion glass, heretofore known is lead silicate glass containing a large quantity of lead. For example, JP-A 57-34042 discloses $SiO_2$—PbO—$B_2O_3$-based high-refractivity high-dispersion glass that contains a large quantity of PbO. However, with the recent problem in that glass containing an environmental pollutant, lead gives a deposit of metal lead in a non-oxidizing atmosphere, a trend has occurred toward stopping the use of it, which is therefore being substituted with a material not containing PbO.

Of conventional optical glass, there is known SF-type glass with a former of $SiO_2$ or $B_2O_3$, but the glass of the type is problematic in that, while it is in precision pressing, the pressed lenses of the glass may often have crystals formed therein and their yield is extremely poor, and therefore the glass is unfavorable for industrial-scale mass production of optical products.

In known molds for precision pressing, there may occur some problems in point of oxidation and deterioration of the mold material and the film when the precision pressing temperature is over 700° C., and, as a result, the molds could hardly keep their surface accuracy, and industrial-scale mass production of lenses by precision pressing with them would be difficult. Accordingly, it is desirable that optical glass for precision pressing is molded through precision pressing at a temperature not higher than 700° C.

As a material capable of being molded in a mode of precision pressing at a temperature not higher than 700° C. with depositing few crystals during pressing, there is known $P_2O_5$-based glass, as in JP-A 2004-588451. However, the glass of the type (glass with a $P_2O_5$-based former) has a problem in that its transmittance lowers when it is irradiated with a predetermined amount of minor weak light even though not irradiated with strong light as indicated by the Japanese Optical Glass Industrial Standards, JOGIS12-$^{19942}$. In general, such minor light is inevitable, the transmittance reduction is extremely disadvantageous for spherical lenses and non-spherical lenses for high-definition digital cameras and optical communication, and for diffraction gratings.

Also known is glass capable of being molded in a mode of precision pressing at a temperature not higher than 700° C. with depositing few crystals during pressing and having a high transmittance and good internal quality, as in JP-A 2004-292301, but the glass of the type (glass with a $P_2O_5$-based former) is also problematic in that its transmittance lowers when it is irradiated with minor weak light. The transmittance reduction is extremely disadvantageous for spherical lenses and non-spherical lenses for high-definition digital cameras and optical communication, and for diffraction gratings.

Patent Reference 1: JP-A 57-34042
Patent Reference 2: JP-A 2004-588451
Patent Reference 3: JP-A 2004-292301

SUMMARY OF THE INVENTION

An object of the invention is to solve the above-mentioned problems and to provide glass having good characteristics of high refractivity and high dispersion, having good precision pressing moldability, not having a defect of transmittance reduction with time, and having high transmittance and good internal quality.

We, the present inventors have assiduously studied and, as a result, have hit on a fact that, in glass with a $P_2O_5$-based former containing $Nb_2O_5$ and $R_2O$ (alkali metal oxide), Pt is a cause of reducing the transmittance of the glass when irradiated with weak light. Given that situation, we have found that, when a platinum-free material is used in a step of melting a starting material mixture into glass, then the Pt content of the resulting glass can be extremely reduced, and therefore, when the platinum content of glass is thus minimized, then a novel material of glass which has good internal quality and has good initial transmittance and of which the transmittance may be prevented from being reduced by weak light can be obtained.

In addition, we have further found that, in glass with a $P_2O_5$-based former containing $Nb_2O_5$ and $R_2O$ (alkali metal oxide), when a nitrate is used as the starting component, then the coloration of the glass component may be prevented and glass of good transmittance can be obtained. On the basis of these findings, we have completed the present invention.

The first constitution of the invention is phosphate optical glass having a Pt content of at most 1.5 ppm.

The second constitution of the invention is the phosphate optical glass of the constitution 1, which is characterized in that, when a sample of the glass polished on both surfaces and having a thickness of 10 mm is irradiated with UV and/or visible light at a light-receiving energy of at most 0.4 $mW \cdot cm^{-2}$ for at least 200 hours, then the difference in the internal transmittance to light having a wavelength of 420 nm, before and after the irradiation (before irradiation—after irradiation) of the sample, as calculated in terms of the sample having a thickness of 10 mm, is at most 0.1.

The third constitution of the invention is the phosphate optical glass of the constitution 1 or 2, which has a refractive index (nd) of at least 1.75 and an Abbe's number of from 15 to 28.5.

The fourth constitution of the invention is the phosphate optical glass of the constitutions 1 to 3, which has Tg of at most 700° C.

The fifth constitution of the invention is the phosphate optical glass of the constitutions 1 to 4, which comprises, as the indispensable ingredients thereof, $P_2O_5$, $Nb_2O_5$ and $R_2O$ (alkali metal).

The sixth constitution of the invention is the phosphate optical glass of the constitutions 1 to 5, which contains any of $WO_3$, $Bi_2O_3$ and RO (alkaline earth metal).

The seventh constitution of the invention is the phosphate optical glass of the constitutions 1 to 6, which is characterized in that the sum total of the cross sections of the bubbles in 100 ml of the glass, as indicated in Table 1 of the Japanese Optical Glass Industrial Standards, JOGIS12-$^{1994}$ (method of measuring bubbles in optical glass), is on Grade 1 to Grade 4, and that the sum total of the cross sections of the inclusions in 100 ml of the glass, as indicated in Table 1 of the Japanese Optical Glass Industrial Standards, JOGIS13-$^{1994}$ (method of measuring inclusions in optical glass), is on Grade 1 to Grade 4.

The eighth constitution of the invention is the phosphate optical glass of the constitutions 1 to 7, which is characterized in that the sum total of the cross sections of the bubbles in 100 ml of the glass, as indicated in Table 1 of the Japanese Optical Glass Industrial Standards, JOGIS12-[1994] (method of measuring bubbles in optical glass), is on Grade 1 to Grade 3, that the sum total of the cross sections of the inclusions in 100 ml of the glass, as indicated in Table 1 of the Japanese Optical Glass Industrial Standards, JOGIS13-[1994] (method of measuring inclusions in optical glass), is on Grade 1 to Grade 3, and that the degree of the striae of the glass, as indicated in Table 2 of the Japanese Optical Glass Industrial Standards, JOGIS11-[1975] (method of measuring striae of optical glass), in on Grade 1 to Grade 3.

The ninth constitution of the invention is the phosphate optical glass of the constitutions 1 to 8, which is characterized in that the degree of the striae of the glass, as indicated in Table 2 of the Japanese Optical Glass Industrial Standards, JOGIS11-[1975] (method of measuring striae of optical glass), in on Grade 1 or Grade 2, that the sum total of the cross sections of the bubbles in 100 ml of the glass, as indicated in Table 1 of the Japanese Optical Glass Industrial Standards, JOGIS12-[1994] (method of measuring bubbles in optical glass), is on Grade 1 or Grade 2, and that the sum total of the cross sections of the inclusions in 100 ml of the glass, as indicated in Table 1 of the Japanese Optical Glass Industrial Standards, JOGIS13-[1994] (method of measuring inclusions in optical glass), is on Grade 1 or Grade 2.

The tenth constitution of the invention is the phosphate optical glass of the constitutions 1 to 9, which has an internal transmittance to light having a wavelength of 420 nm is at least 0.7, as calculated in terms of the sample of the glass having a thickness of 10 mm.

The eleventh constitution of the invention is the phosphate optical glass of the constitutions 1 to 10, wherein a crucible formed of a platinum-free material is used in the step of melting the starting material mixture into glass.

The twelfth constitution of the invention is the phosphate optical glass of the constitutions 1 to 11, wherein a crucible formed of a material comprising mainly quartz is used in the step of melting the starting material mixture into glass.

The thirteenth constitution of the invention is the phosphate optical glass of the constitutions 1 to 12, wherein a non-metallic bubbler is put into the fused glass and oxygen is jetted into it in the step of melting the starting material mixture into glass.

The fourteenth constitution of the invention is the phosphate optical glass of the constitutions 1 to 13, wherein the remaining oxygen concentration in the melting furnace is at least 4% in the step of melting the starting material mixture into glass.

The fifteenth constitution of the invention is the phosphate optical glass of the constitutions 1 to 14, wherein the ratio of the nitrate in the starting glass material is at least 3%.

The sixteenth constitution of the invention is the phosphate optical glass of the constitutions 1 to 15, which contains the following, in terms of percent by mass of the oxide:
  $P_2O_5$ 15 to 35%,
  $Nb_2O_5$ 35 to 60%, and
  $Na_2O$ 0.1 to less than 15%.

The seventeenth constitution of the invention is the phosphate optical glass of the constitutions 1 to 16, which contains the following, in terms of percent by mass of the oxide:
  BaO 0 to less than 25%,
  $Gd_2O_3$ 0 to 5% and/or,
  $K_2O$ 0 to 10% and/or,
  $Li_2O$ 0 to 10% and/or,
  $Bi_2O_3$ 0 to 15% and/or,
  MgO 0 to 10% and/or,
  CaO 0 to 10% and/or,
  SrO 0 to 10% and/or,
  ZnO 0 to 3% and/or,
  $SiO_2$ 0 to 5% and/or,
  $B_2O_3$ 0 to 5% and/or,
  $Al_2O_3$ 0 to 4% and/or,
  $Ta_2O_5$ 0 to 5% and/or,
  $ZrO_2$ 0 to 3% and/or,
  $TiO_2$ 0 to 10% and/or,
  $WO_3$ 0 to 20% and/or,
  $Sb_2O_3$ 0 to 0.1%.

The eighteenth constitution of the invention is an optical device formed by precision-pressing the phosphate optical glass of the constitutions 1 to 17.

The nineteenth constitution of the invention is a precision-pressing preform of the phosphate optical glass of the constitutions 1 to 17.

The twentieth constitution of the invention is an optical device formed by precision-pressing the preform of the constitution 19.

Having the above-mentioned constitutions, the optical glass of the invention has a high initial transmittance and its transmittance is prevented from being reduced by weak light.

DETAILED DESCRIPTION OF THE INVENTION

Concrete embodiments of the optical glass of the invention are described below.

The glass of the invention is optical glass having a Pt content (including metal oxides such as $PtO_3$, $PtO_2$, PtO) is at most 1.5 ppm. Reducing the Pt content of high-refractivity high-dispersion glass results in the reduction in the transmittance thereof by weak light (UV and/or visible light at irradiation of at most 0.4 $mW \cdot cm^{-2}$)

In this description, the wording "transmittance reduction by weak light" is a concept differing from solarization defined for optical glass. In general, when glass is exposed to UV rays for a long period of time, then colorless glass may color, or the color of glass may change. This phenomenon is referred to as solarization. In general, as a cause of solarization, the variation of the variables of Fe and Mn contained in glass as impurities is well known. In the glass as referred to in this description, the transmittance reduction is caused by the Pt content of glass, which, however, is not known up to the present.

For the method of measuring the solarization of optical glass, generally known is irradiation with an ultra-high-pressure mercury lamp as defined in the Japanese Optical Glass Industrial Standards JOGIS04-1994. Different from it, however, the transmission reduction as referred to herein for the optical glass is caused by irradiation with UV and/or visible light at a quantity of at most 0.4 $mW \sim cm^{-2}$ for a predetermined period of time, not irradiated with such strong light as in JOGIS04-1994.

For producing more homogeneous optical glass at high yield, generally used is a melting device, at least a part or all of which that is to be in contact with fused glass is formed of platinum or a platinum alloy material. Accordingly, it is difficult to make the Pt content of glass completely 0 (zero), but for reducing the transmittance reduction by weak light, it is desirable that the Pt content of glass is at most 1.5 ppm and that the content is minimized as much as possible. More preferably, the Pt content is at most 1.0 ppm, even more preferably at most 0.9 pm, most preferably at most 0.8 ppm. In case where the optical glass of the invention is used for optical systems such as lenses, then the reduction in the internal transmittance thereof is preferably at most 0.1. Above all, when it is used for high-precision instruments of which the internal transmittance reduction is not allowable, the reduction in the internal transmittance of the glass is preferably at most 0.05, more preferably at most 0.02. In that case, the Pt content of the glass is preferably at most 0.8 ppm.

As described in the above, the glass of the invention is characterized in that, when a sample of the glass polished on both surfaces is irradiated with UV and/or visible light at a light-receiving energy of at most 0.4 mW·cm$^{-2}$ for at least 200 hours, then the difference in the internal transmittance to light having a wavelength of 420 nm, before and after the irradiation (before irradiation—after irradiation) of the sample, as calculated in terms of the sample having a thickness of 10 mm, is at most 0.1.

The glass of the invention is advantageous for optical use, for example, for high-precision instruments of which the reduction in the transmittance by weak light is undesirable. The optical glass of the invention is characterized in that, when it is irradiated with UV and/or visible light preferably at least 0.005 mW·cm$^{-2}$ more preferably at least 0.01 W·cm$^{-2}$, most preferably at least 0.02 W·cm$^{-2}$ for at least 200 hours, more preferably at least 300 hours, most preferably at least 400 hours, then the difference in the internal transmittance to light having a wavelength of 420 nm, before and after the irradiation (before irradiation—after irradiation) thereof, as calculated in terms of the sample of the glass having a thickness of 10 mm, is at most 0.1, preferably at most 0.06, more preferably at most 0.04.

In this description, "UV and/or visible light" is meant to indicate natural light or in-room light, and concretely, this is light falling within a range of about 290 nm to 1000 nm, more preferably about 350 nm to 800 nm.

In this description, the "internal transmittance, as calculated in terms of the sample of glass having a thickness of 10 mm" is obtained according to the Japanese Optical Glass Industrial Standards JOGIS17-$^{1982}$ "method of measuring the internal transmittance of optical glass".

The glass of the invention is characterized by having characteristics of high refractivity and high dispersion that are significant in planning lenses, and the lowermost limit of its refractive index [nd] is preferably 1.75. Above all, nd of the glass is preferably at least 1.80, more preferably at least 1.83; and the uppermost limit thereof is preferably at most 2.00, more preferably at most 1.90, most preferably at most 1.87. Further, the lowermost limit of the Abbe's number [vd] of the glass is preferably 15, more preferably 18, even more preferably 20; and the uppermost limit thereof is preferably at most 28.5, more preferably 26, even more preferably 25.

Tg of the glass of the invention is preferably at most 700° C. If it is higher than 700° C., then the pressing temperature of the glass may be too high, and the mold for precision pressing would be difficult to repeatedly use for it. More preferably, Tg is at most 680° C., even more preferably at most 670° C.

The glass of the invention is optical glass containing, as the indispensable ingredients thereof, $P_2O_5$, $Nb_2O_5$ and $R_2O$ (alkali metal oxide), preferably having a composition containing any of $WO_3$, $Bi_2O_3$ and RO (alkaline earth metal oxide)

Regarding the evaluation of the bubbling degree of the glass of the invention, bubbles may scatter light applied to the glass when the bubbling grade is larger and therefore the glass having such a high bubbling degree is unfavorable for lenses for optical instruments. For that reason, it is desirable that the bubbling degree is from Grade 1 to Grade 4, more preferably from Grade 1 to Grade 3, most preferably Grade 1 or Grade 2.

Regarding the evaluation of the inclusions in the glass of the invention, inclusions may scatter light applied to the glass when the grade of inclusions is larger and therefore the glass having such a high degree of inclusion is unfavorable for lenses for optical instruments. For that reason, it is desirable that the degree of inclusions is from Grade 1 to Grade 4, more preferably from Grade 1 to Grade 3, most preferably Grade 1 or Grade 2.

Regarding the evaluation of the striae of the glass of the invention, when the grade of striae is higher, then homogeneous glass is more difficult to obtain. Accordingly, glass having a high degree of striae is unfavorable for optical glass of which the homogeneousness is important. Glass on Grade 1 to Grade 4 in point of the striae therein is usable for lenses for optical instruments. For that reason, it is desirable that the degree of striae of the glass of the invention is from Grade 1 to Grade 4, more preferably from Grade 1 to Grade 3, most preferably Grade 1 or Grade 2.

The glass of the invention is characterized by having characteristics of high refractivity and high dispersion that are significant in planning lenses. Lenses having high transmittance require some measures for color correction in planning them, and therefore it is necessary that the internal transmittance of the glass to light at 420 nm is at least 0.7 as calculated in terms of a sample of the glass having a thickness of 10 nm. More preferably, it is at least 0.75, more preferably at least 0.83, even more preferable at least 0.85.

In producing the glass of the invention, it is desirable that a crucible formed of a platinum-free material is used in the step of melting the starting material mixture into glass. In general, platinum is used in melting the starting material mixture into glass, but in producing the glass of the invention, the starting material mixture is melted in a crucible formed of a platinum-free material, in which, therefore glass can be obtained, having few nodules and inclusions and therefore having good internal quality and having a high light transmittance and not having a defect of transmittance reduction with time. More preferably in producing the glass of the invention, a crucible formed of a material comprising mainly quartz is used in the step of melting the starting material mixture into glass.

It is important that the remaining oxygen concentration in the melting furnace is at least 4% in the step of melting the starting material mixture into glass. This is because the oxygen concentration in the glass in the furnace is kept not lower than a predetermined level whereby the coloration of the phosphate glass may be inhibited. The remaining oxygen concentration in the melting furnace is preferably at least 6%, more preferably at least 8%, even more preferably at least 10%, most preferably at least 14%.

In order to keep the oxygen concentration in the furnace not smaller than a predetermined proportion, it is desirable the starting material mixture is melted in an electric furnace in which the oxygen atmosphere is controllable. When a vapor furnace is used for the melting, then it is desirable that the air pressure and the vapor pressure are controlled so as to keep the predetermined oxygen concentration.

In the step of melting it into glass, the starting material mixture is controlled to have a nitrate content of at least 3%. This is extremely effective and important for the purpose of preventing the coloration of the phosphate glass of the invention and for controlling the reaction condition of the glass.

The ingredients of the optical glass of the invention are described below. In this description, the ingredients of the glass are expressed in terms of percent by mass of the oxide. "In terms of percent by mass of oxide" means that all the oxides, the nitrates and others used as the starting materials of the constitutive ingredients of glass are presumed to be decomposed into oxides in melting them, and each ingredient of glass is expressed based on the total mass of the produced oxides of being 100% by mass.

$P_2O_5$ is an ingredient of imparting high dispersibility and high transmittance to glass. As compared with silicate glass and borate glass, $P_2O_5$-containing glass may have good meltability and vitrifiability in pressing, and may have good light transmittance. In addition, $P_2O_5$ is effective for improving the devitrification resistance and transmittance of glass.

If the amount of $P_2O_5$ is too much therein, then the glass could not have an intended high refractivity, and its devitrification resistance may worsen. Accordingly, for obtaining high-refractivity high-dispersion glass having especially excellent devitrification resistance, the lowermost limit of $P_2O_5$ is preferably 15%, more preferably 16%, most preferably 17%, and the uppermost limit thereof is preferably 35%, more preferably 33%, most preferably 30%.

$Nb_2O_5$ is an ingredient for vitrification in a broad range, and is effective for enhancing the high refractivity and the high dispersibility of glass and for improving the chemical resistance of glass, not almost increasing the degree of coloration of glass, and this is therefore an extremely important ingredient. In order to sufficiently exhibit its effects, the lowermost limit of $Nb_2O_5$ is preferably 35%, more preferably 36%, most preferably 37%. If its amount is too large, however, the devitrification resistance of glass may worsen and the light transmittance thereof may lower. Accordingly, the uppermost limit of $Nb_2O_5$ is preferably 60%, more preferably 58%, most preferably 56.5%.

$Na_2O$ is an ingredient extremely effective for lowering the melting temperature of glass and for preventing the coloration thereof. Further, it lowers the glass transition temperature and the yield point of glass. In order to obtain these effects, it is desirable that the $Na_2O$ content of glass is at least 0.1%. More preferably, it is at least 1%, even more preferably at least 3%. However, if the content is too large, then high-refractivity glass which the invention is to obtain may be difficult to obtain and the mean expansion coefficient of glass may be large. Accordingly, the $Na_2O$ content is preferably less than 15%, more preferably less than 10%, most preferably at most 9.6%.

Falling within the range as defined herein, BaO is effective for stabilizing glass in melting and for preventing devitrification of glass to prevent glass from being readily broken, and even for increasing the light transmittance of glass.

On the other hand, however, if its content is too large, then high-refractivity high-dispersion glass which the invention is to obtain may be difficult to obtain. Therefore, the uppermost limit of BaO is preferably less than 25%, more preferably at most 24.7%, most preferably at most 24.5%.

In the $P_2O_5$—$Nb_2O_5$—BaO—$R_2O$-based glass of the invention, $Gd_2O_3$ is effective for increasing the light transmittance of glass, for stabilizing glass in melting, for improving the devitrification resistance of glass, for improving the homogeneousness thereof and for improving the phase-separation resistance of glass in melting, still keeping the high refractivity of the glass as it is, and therefore $Gd_2O_3$ is an important ingredient that is effective for facilitating the production of glass of good internal quality. For the purpose of these results, the ingredient $Gd_2O_3$ may be optionally added to the glass of the invention in any desired manner. On the other hand, however, if its amount is too large, then the devitrification resistance of glass may worsen. Accordingly, the uppermost limit of $Gd_2O_3$ is preferably 5%, more preferably 4.8%, most preferably 4.5%.

$K_2O$ is an ingredient capable of lowering the glass transition temperature and the yield point of glass, and it may be optionally added to the glass of the invention. On the other hand, however, if its amount is too large, then the glass may readily devitrify in melting, and as a result, the internal quality of the glass may worsen. Accordingly, the uppermost limit of $K_2O$ is preferably 10%, more preferably 8%, most preferably 6%.

$Li_2O$ is effective for lowering the glass transition temperature and the yield point of glass, and it may be optionally added to the glass of the invention. On the other hand, however, if its amount is too large, then the chemical resistance of glass may worsen and the workability thereof may also worsen. Accordingly, the uppermost limit of $Li_2O$ is preferably 10%, more preferably less than 6%. In addition, for obtaining glass having good chemical resistance and having a small mean linear expansion coefficient and therefore having good workability, the $Li_2O$ content is most preferably less than 2%.

$Bi_2O_3$ is an optical ingredient of the glass of the invention, which is effective for lowering the melting point of glass and for producing high-refractivity high-dispersion glass. On the other hand, however, if its amount is too large, then the transmittance of glass within a short wavelength range may worsen. Preferably, therefore, the $Bi_2O_3$ content is at most 10%. For obtaining glass that is more resistant to devitrification, the problem may be solved by further reducing the $Bi_2O_3$ content. Preferably, the $Bi_2O_3$ content is less than 5%, more preferably at most 4.5%, most preferably less than 3%.

MgO, CaO and SrO are optional ingredients, which are effective for stabilizing glass in melting and for preventing devitrification of glass. On the other hand, however, if their amount is too large, then homogenous glass may be difficult to obtain. Preferably, therefore, these ingredients is at most 10% each, more preferably less than 5% each. Most preferably, the uppermost limit of CaO is 3%, that of Mg is 3%, and that of SrO is 3%.

In this specification, "$R_2O$" means one or more ingredients selected from the group consisting of $Li_2O$, $Na_2O$ and $K_2O$, "RO" means one or more ingredients selected from the group consisting of MgO, CaO, SrO and BaO.

ZnO and $ZrO_2$ are optional ingredients, which are effective for controlling the optical constant of glass. On the other hand, however, if their amount is too large, then the devitrification resistance of glass may worsen. Preferably, the uppermost limit of ZnO is 3%, more preferably less than 3%, even more preferably 2.9%; and the uppermost limit of $ZrO_2$ is 3%, more preferably 2.5%, most preferably 2%.

$SiO_2$ is an optional ingredient of the glass of the invention, which is effective for improving the chemical resistance of glass. On the other hand, however, if its amount is too large, then the meltability of glass may worsen. Preferably, therefore, the uppermost limit is 5%, more preferably less than 4%, most preferably 2%.

$B_2O_3$ is an optional ingredient, which is effective for improving the devitrification resistance of glass. In particular, in $P_2O_5$—$Nb_2O_5$-based glass, $SiO_2$ may often remain undissolved, but when $B_2O_3$ is therein, then the meltability of the glass is improved and, in addition, the chemical resistance thereof is also improved. On the other hand, however, if the $B_2O_3$ content is too large, then high-refractivity high-dispersibility glass which the invention is to obtain may be difficult to obtain. Preferably, therefore, the uppermost limit of the $B_2O_3$ content is 5%, more preferably 3%.

$Al_2O_3$ is an optional ingredient, which is effective for improving the chemical resistance of glass and for increasing the light transmittance, thereof. On the other hand, however, if its amount is too large, then the devitrification of glass may increase. Preferably, therefore, its uppermost limit is 4%, more preferably 3%, most preferably 2%.

$Ta_2O_5$ is an optional ingredient, which is effective for increasing the refractive index of glass. On the other hand, however, if its amount is too large, then the striae of glass may increase and, as a result, homogeneous glass may be difficult to obtain. In addition, since the material for $Ta_2O_5$ is extremely expensive, it is desirable that $Ta_2O_5$ is added only when needed. Preferably, the uppermost limit of $Ta_2O_5$ is 5%, more preferably 3%, most preferably no $Ta_2O_5$ is added.

$TiO_2$ is an ingredient for increasing the refractive index of glass. On the other hand, however, if its amount is too large, then the light transmittance of glass may worsen and further, the glass may be readily devitrified in melting or pressing. Preferably, the uppermost limit of $TiO_2$ is 10%, more preferably 5% and especially when glass having good internal quality and having a high light transmittance in a short wavelength range is desired, then the uppermost limit of $TiO_2$ is more preferably 3%, most preferably no $TiO_2$ is added.

$WO_3$ is an ingredient capable of imparting high refractivity and high dispersibility to glass while keeping the low melting point of glass containing it. On the other hand, however, if its amount is too large, then the light transmittance of glass in a short wavelength range may worsen. Preferably, the uppermost limit of $WO_3$ is 20%, more preferably 15%, most preferably 10%. Especially for obtaining glass having good internal quality and having an extremely high light transmittance in a short wavelength range, the $WO_3$ content is more preferably at most 5%, and even more preferably, no $WO_3$ is added.

When existing in a small amount, $Sb_2O_3$ is effective for removing bubbles (defoamability) in melting glass. However, even if its amount increases a little, the light transmittance of glass in a short wavelength range may worsen. Preferably, therefore, the uppermost limit of $Sb_2O_3$ is 0.1%, more preferably 0.05%, even more preferably 0.01%.

In producing the optical glass of the invention for use in optical devices typically such as lenses, prisms, mirrors, molten glass is dripped down through the outlet port of a flow pipe formed of platinum or the like to give typically a spherical preform. The preform is molded in a mode of precision pressing to give an optical device having a desired shape.

Any other ingredients may be optionally added to the glass of the invention, not detracting from the properties of the glass. However, transition metal ingredients such as V, Cr, Mn, Fe, Co, Ni, Cu, Ag and Mo, except Ti, may color glass even when a small amount thereof, either singly or as combined, is added thereto, and therefore the resulting glass may absorb light having a specific wavelength within a visible light range. Accordingly, it is desirable that the optical glass for use in a visible light wavelength range does not substantially contain such transition metal ingredients.

Similarly, rare earth ingredients except Gd may color glass owing to their absorption of light having a specific wavelength within a visible light range, when added either singly or as combined, or may increase the devitrification of glass. Accordingly, it is desirable that such rare earth ingredients are not in the glass of the invention.

A Th ingredient may be in the glass of the invention for the purpose of increasing the refractive index of the glass and for stabilizing the glass; and the Cd and Tl ingredients may also be therein for the purpose of lowering the glass transition point (Tg) of the glass. On the other hand, however, the ingredients with Pb, Th, Cd, Tl and Os are harmful chemicals and are therefore prevented from being used these days. When these ingredients are used, not only in the process of producing glass but also in the other processes of working glass and of treating the wastes after products, some measures must be taken for environmental protection. Therefore, when the influence of these ingredients on the environment is considered to be important, then it is desirable that the glass of the invention does not substantially contain these ingredients.

PbO has a large specific gravity. Therefore, when glass containing it is used for lenses, then it may be a bar to the reduction in the weight of optical instruments, which is extremely desired these days. In addition, lead requires some additional measures for environmental protection in producing, working and discarding glass containing it, for which additional costs may be necessary. Accordingly, PbO should not be in the glass of the invention.

$As_2O_3$ is an ingredient used for improving the removability of bubbles (deformability) of glass in melting. However, it requires some additional measures for environmental protection in producing, working and discarding glass containing it. Preferably, therefore, $As_2O_3$ is not in the glass of the invention.

Table 1 shows the compositions of Examples (No. 1 to No. 6) of the optical glass of the invention, the ratio of the nitrate in the glass materials, the refractive index (nd) and the Abbe's number (vd) of glass, the result of evaluation of bubbles (grade), the result of evaluation of inclusions (grade), the result of evaluation of striae (grade), the glass transition point (° C.), the internal transmittance at 420 nm (thickness, 10 mm), the reduction in the internal transmittance before and after irradiation test, the Pt content of glass (ppm), and the remaining oxygen concentration (%) in the melting furnace in the step of melting the starting material mixture into glass.

For the glass of Examples of the invention, ordinary starting materials for optical glass, such as oxide, carbonate, nitrate and phosphate were metered in the ratio for the composition of each Example as in Table 1, then they were mixed, put into a quartz crucible for ordinary optical glass, then roughly melted therein, and thereafter the resulting melt was transferred into a platinum crucible, and melted therein at 850° C. to 1300° C., depending on the meltability of the glass composition, for 1 to 4 hours, clarified, stirred, then cast into a mold, and gradually cooled therein. The process gave glass of Examples.

The glass of Examples may also be produced by melting a roughly-melted glass block in a crucible formed of a platinum-free material (e.g., quartz), using a device in which the part to be in contact with molten glass is partially or wholly formed of quartz and platinum, or platinum or platinum alloy, in accordance with the method introduced in JP-B 43-12885 or Dr. Hans Bach, editor, Low Thermal Expansion Glass Ceramics (Springer-Verlag Berlin Heidelberg Printed in Germany 1995), 132, at 850 to 1300° C., and then gradually cooling it.

For the glass of Comparative Example, ordinary starting materials for optical glass were metered in the ratio for the composition of Comparative Example as in Table 2, then they were mixed, put into a quartz crucible for ordinary optical glass, then roughly melted therein, and thereafter the resulting melt was transferred into a platinum crucible, and melted therein at 850° C. to 1300° C., depending on the meltability of the glass composition, for 1 to 4 hours, clarified, stirred, then cast into a mold, and gradually cooled therein. The process gave glass of Comparative Example, and this was analyzed in the same manner as in Examples.

From the glass obtained in the manner as above, samples were taken out for measuring the refractive index [nd] and the Abbe's number [vd] of glass, for evaluating the internal quality thereof, for measuring the glass transition point [Tg] thereof, for measuring the internal transmittance of glass, and for measuring the Pt content thereof.

The refractive index [nd] and the Abbe's number [vd] were measured of the glass produced by gradually cooling it at a cooling speed of −25° C./hr.

For the evaluation of bubbles, the glass sample was analyzed according to the Japanese Optical Glass Industrial Standards, JOGIS12-[1994] (method of measuring bubble in optical glass). Briefly, based on Table 1 of the Standards, the sum total ($mm^2$) of the cross sections of the bubbles in 100 ml of the glass sample is obtained, and the sample is classified based on the result. Grade 1 of glass means that the sum total of the cross sections of bubbles in the glass is less than 0.03 $mm^2$; Grade 2 means that it is from 0.03 to less than 0.1 $mm^2$; Grade 3 means that it is from 0.1 to less than 0.25 $mm^2$; Grade 4 means that it is from 0.25 to less than 0.5 $mm^2$; and Grade 5 means that it is 0.5 $mm^2$ or more.

For the evaluation of inclusions, the glass sample was analyzed according to the Japanese Optical Glass Industrial Standards, JOGIS13-[1994] (method of measuring inclusions in optical glass). Briefly, based on Table 1 of the Standards, the sum total ($mm^2$) of the cross sections of the inclusions in 100 ml of the glass sample is obtained, and the sample is classified based on the result. The inclusions as referred to in the Standards includes, for example, devitrification, platinum nodules (fine crystals of platinum), fine bubbles and other inclusions similar to these. Grade 1 of glass means that the sum total of the cross sections of inclusions in the glass is less than 0.03 $mm^2$; Grade 2 means that it is from 0.03 to less than 0.1 $mm^2$; Grade 3 means that it is from 0.1 to less than 0.25 $mm^2$; Grade 4 means that it is from 0.25 to less than 0.5 $mm^2$; and Grade 5 means that it is 0.5 $mm^2$ or more.

For the evaluation of striae, the glass sample was analyzed according to the Japanese Optical Glass Industrial Standards, JOGIS11-[1975] (method of measuring striae of optical glass). Briefly, based on Table 2 of the Standards, the glass sample was analyzed for the striae therein. The glass sample has a size of 50×50×20 mm, and both surfaces thereof having a size of 50×20 mm are polished in parallel to each other. Grade 1 of glass means that no striae were found; Grade 2 means that thin and dispersed striae, which are the limit for visual observation, were found; Grade 4 means that a few striae were found in the vertical direction and the parallel direction to the polished surfaces; and Grade 4 means that more striae than those in the samples on Grade 3 were found in the vertical direction and the parallel direction to the polished surfaces, or thick and parallel striae were found.

The glass transition point [Tg] was measured with a thermal expansion meter, by heating the glass at a heating rate of 8° C./min.

The internal transmittance was measured according to the Japanese Optical Glass Industrial Standards, JOGIS17-[1982] (method of measuring internal transmittance of optical glass). Two samples of the same glass, each having a different thickness, were tested for measuring the internal transmittance thereof. The internal transmittance reduction was determined as follows: In a dark room, a sample of which both surfaces had been polished was irradiated with light from a fluorescent lamp (100 V/6 W straight white fluorescent lamp) set parallel to the sample, for 200 hours, and the difference in the internal transmittance (thickness 10 mm) of the sample before and after the irradiation at 420 nm was obtained. In Example 6, a sharp cut filter having a transmittance limit wavelength of 420 nm (L-42 by Kenko) was attached to the surface of the sample to be irradiated, and the other surface thereof not irradiated was wrapped with aluminium foil so as to cut off as much as possible the light shorter than 420 nm in the irradiation test.

For the light source, used was a white fluorescent lamp (6 W white fluorescent lamp having a luminous flux of 240 lm (lumen)). At a position spaced by 55 mm from the center point of the fluorescent lamp, the polished surface of the glass sample was set to be in parallel to the fluorescent lamp and the light source, and in that condition, the glass sample was irradiated with light from the fluorescent lamp.

In this test, at the same position as that where the polished surface of the glass sample was set to face the light source (that is, the position spaced by 55 mm from the center point of the fluorescent lamp), a UV integrating light quantity meter (UVD-S405, separate-type light receiver (by Ushio Electric)) was set, and the quantity of light at that position was measured. It was 0.393 ($mW/cm^2$).

The platinum content of glass was determined by dissolving glass in hydrofluoric acid+nitric acid, and then analyzing it with an ICP mass spectrometer, SPQ9000 Model by Seiko Electronics.

The oxygen concentration was measured as follows: In melting glass, the oxygen concentration on the glass surface was measured with a combustion control tester (Model MX-512, by Komei Rikagaku Kogyo).

TABLE 1

|  | Example 1 | Example 2 | Example 3 | Example 4 | Example 5 | Example 6 |
|---|---|---|---|---|---|---|
| $SiO_2$ | 0.50 | 0.70 | 0.50 | 0.72 | 0.86 | 0.50 |
| $B_2O_3$ | 0.50 | 0.20 | 0.50 | 1.73 | 1.26 | 0.50 |
| $P_2O_5$ | 25.00 | 29.00 | 25.00 | 24.17 | 26.26 | 25.00 |
| $Gd_2O_3$ | 2.00 | 1.35 | 2.00 | 0.50 | 0.30 | 2.00 |
| $Nb_2O_5$ | 50.00 | 46.00 | 50.00 | 37.05 | 36.91 | 50.00 |
| $WO_3$ |  |  |  | 10.62 | 13.43 |  |
| ZnO |  |  |  |  | 1.47 |  |
| SrO | 1.00 |  |  |  |  | 1.00 |
| BaO | 11.79 | 11.58 | 12.79 | 4.36 | 4.23 | 11.79 |
| $Li_2O$ |  | 0.97 |  | 2.69 | 4.54 |  |
| $Na_2O$ | 7.50 | 8.00 | 7.50 | 8.15 | 5.63 | 7.50 |
| $K_2O$ | 0.20 |  | 0.20 |  | 1.85 | 0.20 |
| $Sb_2O_3$ | 0.01 |  | 0.01 |  |  | 0.01 |
| $Bi_2O_3$ | 1.50 | 2.20 | 1.50 | 10.01 |  | 1.50 |
| $TiO_2$ |  |  |  |  | 3.26 |  |
| Total | 100 | 100 | 100 | 100 | 100 | 100 |
| Proportion of Nitrate in Glass Material | 5% | 5% | 5% | 5% | 5% | 5% |
| $n_d$ | 1.84500 | 1.80500 | 1.84500 | 1.82665 | 1.81231 | 1.84500 |

TABLE 1-continued

|  | Example 1 | Example 2 | Example 3 | Example 4 | Example 5 | Example 6 |
|---|---|---|---|---|---|---|
| $v_d$ | 23.80 | 25.40 | 23.80 | 24.40 | 24.40 | 23.80 |
| Result of Evaluation of bubbles (Grade) | 1 | 1 | 2 | 3 | 3 | 1 |
| Result of Evaluation of inclusions (Grade) | 1 | 1 | 2 | 3 | 3 | 1 |
| Result of Evaluation of Striae (Grade) | 1 | 1 | 2 | 3 | 3 | 1 |
| Tg (° C.) | 660 | 605 | 660 | 476 | 479 | 660 |
| Internal Transmittance ($\tau$ 10 mm: 420 nm) | 0.932 | 0.955 | 0.954 | 0.767 | 0.838 | 0.932 |
| Transmittance Reduction (internal transmittance before irradiation - internal transmittance after irradiation) ($\tau$ 10 mm: 420 nm) | 0.010 | 0.006 | 0.005 | 0.016 | 0.009 | 0.007 |
| Pt Content of Glass (ppm) | 0.8 | 0.7 | 0.5 | 0.9 | 0.6 | 0.8 |
| Remaining Oxygen Concentration in Melting Furnace (%) | 11% | 11% | 11% | 20% | 20% | 11% |

TABLE 2

|  | Comparative Example A |
|---|---|
| $SiO_2$ | 0.70 |
| $B_2O_3$ | 0.20 |
| $P_2O_5$ | 29.00 |
| $Gd_2O_3$ | 1.35 |
| $Nb_2O_5$ | 46.00 |
| BaO | 11.58 |
| $Li_2O$ | 0.97 |
| $Na_2O$ | 8.00 |
| $K_2O$ |  |
| $Sb_2O_3$ |  |
| $Bi_2O_3$ | 2.20 |
| Total | 100 |
| Proportion of Nitrate in Glass Material | 5% |
| $n_d$ | 1.84500 |
| $v_d$ | 23.80 |
| Result of Evaluation of bubbles (Grade) | 1 |
| Result of Evaluation of Inclusions (Grade) | 1 |
| Result of Evaluation of Striae (Grade) | 1 |
| Tg (° C.) | 660 |
| Internal Transmittance ($\tau$ 10 mm: 420 nm) | 0.6900 |
| Transmittance Reduction (internal transmittance before irradiation - internal transmittance after irradiation) ($\tau$ 10 mm: 420 nm) | 0.10 |
| Pt Content of Glass (ppm) | 2.6 |
| Remaining Oxygen Concentration in Melting Furnace (%) | 5% |

The glass of Examples (Nos. 1 to 6) of the invention has a reduced Pt content falling within a predetermined range; and, as compared with the glass of Comparative Example (No. A), the former all has an increased light transmittance and excellent internal quality and is free from a drawback of transmittance reduction by weak light, satisfying the object of the invention.

As described hereinabove, the optical glass of the invention comprises a $P_2O_5$-based former and is characterized by containing $Nb_2O_5$ and $R_2O$ (alkali metal), and the Pt content of the glass is controlled to be not higher than a predetermined level. Therefore, the glass has excellent initial transmittance, and its transmittance reduction by weak light is prevented. In addition to these characteristics thereof, the glass of the invention may have a glass transition temperature not higher than 700° C., and therefore, the life of the precision-pressing mold for it can be prolonged. Accordingly, the invention may provide a low-melting-point optical glass.

Further, in the step of melting the starting material mixture into glass in producing the optical glass of the invention, a device formed of a platinum-free material may be used, whereby the Pt content of the glass produced may be greatly reduced. In addition, when a nitrate is used as the starting material, then the glass produced may be prevented from coloring, and the glass of the invention may have a good transmittance.

What is claimed is:

1. Phosphate optical glass comprising, in terms of percent by mass:
$P_2O_5$ 15 to 35%,
$Nb_2O_5$ 35 to 60%,
$Na_2O$ 0.1 to less than 15%,
BaO 0 to less than 25%,
$Gd_2O_3$ 0 to 5%,
$K_2O$ 0 to 10%,
$Li_2O$ 0 to 10%,
$Bi_2O_3$ 0 to 15%,
MgO 0 to 10%,
CaO 0 to 10%,
SrO 0 to 10%,
ZnO 0 to 3%,
$SiO_2$ 0 to 5%,
$B_2O_3$ 0 to 5%,
$Al_2O_3$ 0 to 4%,
$Ta_2O_5$ 0 to 5%,
$ZrO_2$ 0 to 3%,
$TiO_2$ 0 to 10%,
$WO_3$ 0 to 20% and
$Sb_2O_3$ 0 to 0.1%, wherein the phosphate optical glass contains Pt no more than 0.8 ppm, and wherein, when a sample of the glass polished on both surfaces and having an internal transmittance to light and a thickness of 10 mm is irradiated with UV and/or visible light at a light-receiving energy of at most 0.4 mW·cm$^{-2}$ for at least 200 hours, then a difference in the internal transmittance to light having a wavelength of 420 nm, before and after the irradiation (before irradiation—after irradiation) of the sample, as calculated in terms of the sample having a thickness of 10 mm, is at most 0.1.

2. The phosphate optical glass as claimed in claim 1, which has a refractive index (nd) of at least 1.75 and an Abbe's number of from 15 to 28.5.

3. The phosphate optical glass as claimed in claim 1, which has Tg of at most 700° C.

4. The phosphate optical glass as claimed in claim 1, which comprises, as the indispensable ingredients thereof, $P_2O_5$, $Nb_2O_5$ and $R_2O$ (alkali metal oxide).

5. The phosphate optical glass as claimed in claim 1, which contains any of $WO_3$, $Bi_2O_3$ and RO (alkaline earth metal oxide).

6. The phosphate optical glass as claimed in claim 1, which is characterized in that the sum total of the cross sections of the bubbles in 100 ml of the glass, as indicated in Table 1 of the Japanese Optical Glass Industrial Standards, JOGIS12-$^{1994}$ (method of measuring bubbles in optical glass), is on Grade 1 to Grade 4, and that the sum total of the cross sections of the inclusions in 100 ml of the glass, as indicated in Table 1 of the Japanese Optical Glass Industrial Standards, JOGIS13-$^{1994}$ (method of measuring inclusions in optical glass), is on Grade 1 to Grade 4.

7. The phosphate optical glass as claimed in claim 1, which is characterized in that the sum total of the cross sections of the bubbles in 100 ml of the glass, as indicated in Table 1 of the Japanese Optical Glass Industrial Standards, JOGIS12-$^{1994}$ (method of measuring bubbles in optical glass), is on Grade 1 to Grade 3, that the sum total of the cross sections of the inclusions in 100 ml of the glass, as indicated in Table 1 of the Japanese Optical Glass Industrial Standards, JOGIS13-$^{1994}$ (method of measuring inclusions in optical glass), is on Grade 1 to Grade 3, and that the degree of the striae of the glass, as indicated in Table 2 of the Japanese Optical Glass Industrial Standards, JOGIS11-$^{1975}$ (method of measuring striae of optical glass), in on Grade 1 to Grade 3.

8. The phosphate optical glass as claimed in claim 1, which is characterized in that the degree of the striae of the glass, as indicated in Table 2 of the Japanese Optical Glass Industrial Standards, JOGIS11-$^{1975}$ (method of measuring striae of optical glass), in on Grade 1 or Grade 2, that the sum total of the cross sections of the bubbles in 100 ml of the glass, as indicated in Table 1 of the Japanese Optical Glass Industrial Standards, JOGIS12-$^{1994}$ (method of measuring bubbles in optical glass), is on Grade 1 or Grade 2, and that the sum total of the cross sections of the inclusions in 100 ml of the glass, as indicated in Table 1 of the Japanese Optical Glass Industrial Standards, JOGIS13-$^{1994}$ (method of measuring inclusions in optical glass), is on Grade 1 or Grade 2.

9. The phosphate optical glass as claimed in claim 1, which has an internal transmittance to light having a wavelength of 420 nm is at least 0.7, as calculated in terms of the sample of the glass having a thickness of 10 mm.

10. The phosphate optical glass as claimed in claim 1, wherein a crucible formed of a platinum-free material is used in the step of melting the starting material mixture into glass.

11. The phosphate optical glass as claimed in claim 1, wherein a crucible formed of a material comprising mainly quartz is used in the step of melting the starting material mixture into glass.

12. The phosphate optical glass as claimed in claim 1, wherein a non-metallic bubbler is put into the fused glass and oxygen is jetted into it in the step of melting the starting material mixture into glass.

13. The phosphate optical glass as claimed in claim 1, wherein the remaining oxygen concentration in the melting furnace is at least 4% in the step of melting the starting material mixture into glass.

14. The phosphate optical glass as claimed in claim 1, wherein the ratio of the nitrate in the starting glass material is at least 3%.

15. An optical device formed by precision-pressing a phosphate optical glass comprising, in terms of percent by mass:
$P_2O_5$ 15 to 35%,
$Nb_2O_5$ 35 to 60%,
$Na_2O$ 0.1 to less than 15%,
BaO 0 to less than 25%,
$Gd_2O_3$ 0 to 5%,
$K_2O$ 0 to 10%,
$Li_2O$ 0 to 10%,
$Bi_2O_3$ 0 to 15%,
MgO 0 to 10%,
CaO 0 to 10%,
SrO 0 to 10%,
ZnO 0 to 3%,
$SiO_2$ 0 to 5%,
$B_2O_3$ 0 to 5%,
$Al_2O_3$ 0 to 4%,
$Ta_2O_5$ 0 to 5%,
$ZrO_2$ 0 to 3%,
$TiO_2$ 0 to 10%,
$WO_3$ 0 to 20%, and
$Sb_2O_3$ 0 to 0.1%,
wherein the phosphate optical glass has a Pt content of at most 0.8 ppm; and
when a sample of the glass polished on both surfaces and having an internal transmittance to light and a thickness of 10 mm is irradiated with UV and/or visible light at a light-receiving energy of at most 0.4 mW·cm$^{-2}$ for at least 200 hours, then a difference in the internal transmittance to light having a wavelength of 420 nm, before and after the irradiation (before irradiation—after irradiation) of the sample, as calculated in terms of the sample having a thickness of 10 mm, is at most 0.1.

16. A precision-pressing perform of a phosphate optical glass comprising, in terms of percent by mass:
$P_2O_5$ 15 to 35%,
$Nb_2O_5$ 35 to 60%,
$Na_2O$ 0.1 to less than 15%,
BaO 0 to less than 25%,
$Gd_2O_3$ 0 to 5%,
$K_2O$ 0 to 10%,
$Li_2O$ 0 to 10%,
$Bi_2O_3$ 0 to 15%,
MgO 0 to 10%,
CaO 0 to 10%,
SrO 0 to 10%,
ZnO 0 to 3%,
$SiO_2$ 0 to 5%,
$B_2O_3$ 0 to 5%,
$Al_2O_3$ 0 to 4%,
$Ta_2O_5$ 0 to 5%,
$ZrO_2$ 0 to 3%, TiO$_2$ 0 to 10%,
WO$_3$ 0 to 20%, and
Sb$_2$O$_3$ 0 to 0.1%,
wherein the phosphate optical glass has a Pt content of at most 0.8 ppm; and
when a sample of the glass polished on both surfaces and having an internal transmittance to light and a thickness of 10 mm is irradiated with UV and/or visible light at a light-receiving energy of at most 0.4 mW·cm$^{-2}$ for at least 200 hours, then a difference in the internal transmittance to light having a wavelength of 420 nm, before and after the irradiation (before irradiation—after irradiation) of the sample, as calculated in terms of the sample having a thickness of 10 mm, is at most 0.1.

17. An optical device formed by precision-pressing the preform of claim 16.

* * * * *